US012590004B2

(12) United States Patent
Zhao et al.

(10) Patent No.: US 12,590,004 B2
(45) Date of Patent: Mar. 31, 2026

(54) CONDUCTIVE DIAMOND/AMORPHOUS CARBON COMPOSITE MATERIAL HAVING HIGH STRENGTH AND PROCESS FOR PREPARING THE SAME

(71) Applicant: YANSHAN UNIVERSITY, Qinhuangdao City (CN)

(72) Inventors: Zhisheng Zhao, Qinhuangdao City (CN); Bing Liu, Qinhuangdao City (CN); Zihe Li, Qinhuangdao City (CN); Yingju Wu, Qinhuangdao City (CN); Kun Luo, Qinhuangdao City (CN); Lei Sun, Qinhuangdao City (CN); Baozhong Li, Qinhuangdao City (CN); Julong He, Qinhuangdao City (CN); Dongli Yu, Qinhuangdao City (CN); Zhongyuan Liu, Qinhuangdao City (CN); Wentao Hu, Qinhuangdao City (CN); Bo Xu, Qinhuangdao City (CN); Yongjun Tian, Qinhuangdao City (CN)

(73) Assignee: YANSHAN UNIVERSITY (CN)

( * ) Notice: Subject to any disclaimer, the term of this patent is extended or adjusted under 35 U.S.C. 154(b) by 878 days.

(21) Appl. No.: 17/847,440

(22) Filed: Jun. 23, 2022

(65) Prior Publication Data

US 2023/0159336 A1 May 25, 2023

(30) Foreign Application Priority Data

Nov. 23, 2021 (CN) .......................... 202111397981.4

(51) Int. Cl.
*C01B 32/25* (2017.01)
*C01B 32/05* (2017.01)

(52) U.S. Cl.
CPC .............. *C01B 32/25* (2017.08); *C01B 32/05* (2017.08); *C01P 2002/02* (2013.01); *C01P 2006/40* (2013.01)

(58) Field of Classification Search
CPC ....... C01B 32/25; C01B 32/05; C01B 32/182; C01B 32/184; C01B 32/186;
(Continued)

(56) References Cited

U.S. PATENT DOCUMENTS

2017/0050886 A1* 2/2017 Satoh .................... C04B 35/645
2017/0333998 A1* 11/2017 Sumiya ................. C04B 35/645
2021/0039950 A1* 2/2021 Zhao ........................ B24D 3/00

FOREIGN PATENT DOCUMENTS

CN 1726174 A 1/2006
CN 102203374 A 9/2011
(Continued)

OTHER PUBLICATIONS

Britun, et al., Structure Formation of the Superhard Carbon Ceramics in Sintering Powders of the Carbon Amorphous Phase in a Mixture with Nanocrystalline Diamond at High Static Pressures, Journal of Superhard Materials 2011; 33(5): 293-299 (Year: 2011).*
(Continued)

*Primary Examiner* — Daniel C. McCracken
(74) *Attorney, Agent, or Firm* — MASCHOFF BRENNAN

(57) ABSTRACT

The present application discloses a conductive high-strength diamond/amorphous carbon composite material and a preparation process thereof. The diamond/amorphous carbon composite material is composed of an amorphous carbon continuous phase and multiple separate diamond phases embedded in the amorphous carbon continuous phase, wherein the diamond phases exhibit an ordered sp3 hybrid state, and the amorphous carbon continuous phase exhibits
(Continued)

a disordered sp2 hybrid state. The present application further discloses a process for preparing the above diamond/amorphous carbon composite material. The process comprises using sp3 carbon powder or glassy carbon as a raw material to obtain the above-mentioned material by sintering. The diamond/amorphous carbon composite material shows good electrical conductivity, good electrical discharge machining ability, good chemical stability and light weight, and has broad application prospects in aerospace, automobile industry and biomedical equipment.

8 Claims, 4 Drawing Sheets

(58) Field of Classification Search
CPC ..... C01B 32/188; C01B 32/19; C01B 32/192; C01B 32/194; C01B 32/196; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; C01P 2002/02; C01P 2006/40; C04B 2235/422; C04B 2235/425; C04B 2235/427; C04B 35/645; C04B 2235/604; C04B 2235/6565; C04B 2235/666; C04B 35/522; C04B 35/52; C04B 35/622; C04B 35/64; C04B 2235/6562; C04B 2235/6567; C04B 2235/66; C04B 2235/667; C04B 2235/668; C04B 2235/96
See application file for complete search history.

(56) References Cited

FOREIGN PATENT DOCUMENTS

| | | | | |
|---|---|---|---|---|
| CN | 106132906 | A | 11/2016 | |
| CN | 106164017 | A | 11/2016 | |
| CN | 107207358 | A | 9/2017 | |
| CN | 109400160 | A | 3/2019 | |
| CN | 110330006 | * | 10/2019 | ............ C01B 32/05 |
| CN | 110330006 | A | 10/2019 | |
| CN | 112158835 | A | 1/2021 | |
| CN | 112678817 | A | 4/2021 | |
| CN | 112830784 | A | 5/2021 | |
| JP | 2001181044 | A | 7/2001 | |
| JP | 2018074172 | A | 5/2018 | |
| JP | 2021024774 | A | 2/2021 | |
| JP | 2021527958 | A | 10/2021 | |
| WO | 2020008722 | A1 | 1/2020 | |

OTHER PUBLICATIONS

Fitzer, et al., Recommended Terminology for the Description of Carbon As a Solid, Pure & Appl. Chem. 1995; 67(3): 473-506 (Year: 1995).*
Zheng, et al., Synthesis of quenchable amorphous diamond, Nature Communications 8; 322: pp. 1-7 (Aug. 22, 2017) (Year: 2017).*
The State Intellectual Property Office of the People's Republic of China; Second Office Action dated May 16, 2024; issued in CN app. No. 202111397981.4; 17 pages.
The Extended European Search Report for the European Patent Application No. 22182161.4, issued on Dec. 14, 2022.
The First Office Action issued by the State Intellectual Property Office of China dated Nov. 17, 2023 for the Chinese Patent Application No. 202111397981.4 (English Translation included).
Hu et al. "Compressed glassy carbon: An ultrastrong and elastic interpenetrating graphene network." Science advances. 3(6), Jun. 9, 2017: e1603213.
The first Office Action issued by the Japanese Patent Office dated Jun. 15, 2023 for the Japanese Patent Application No. 2022-104765. (English translation included).

* cited by examiner

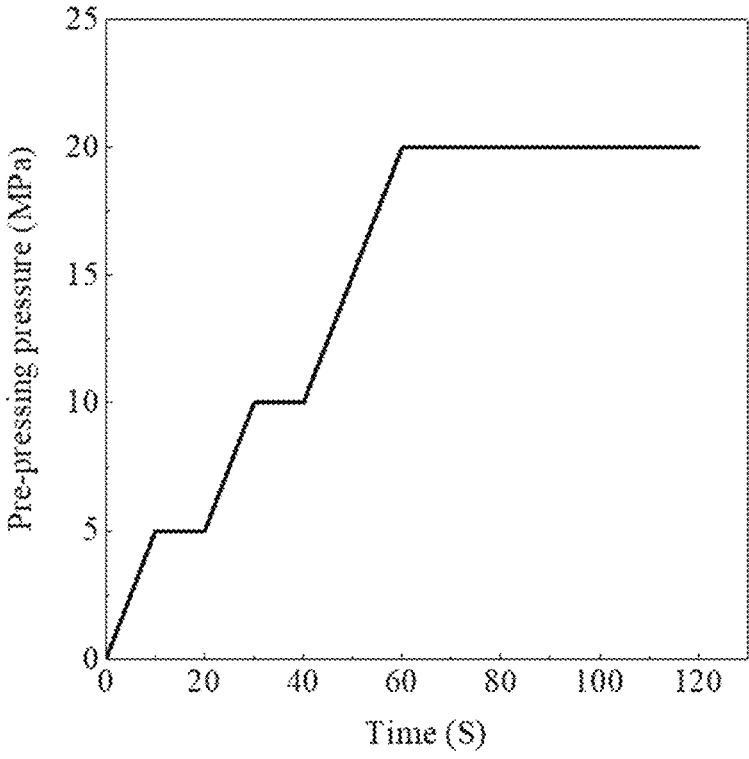
Fig. 1
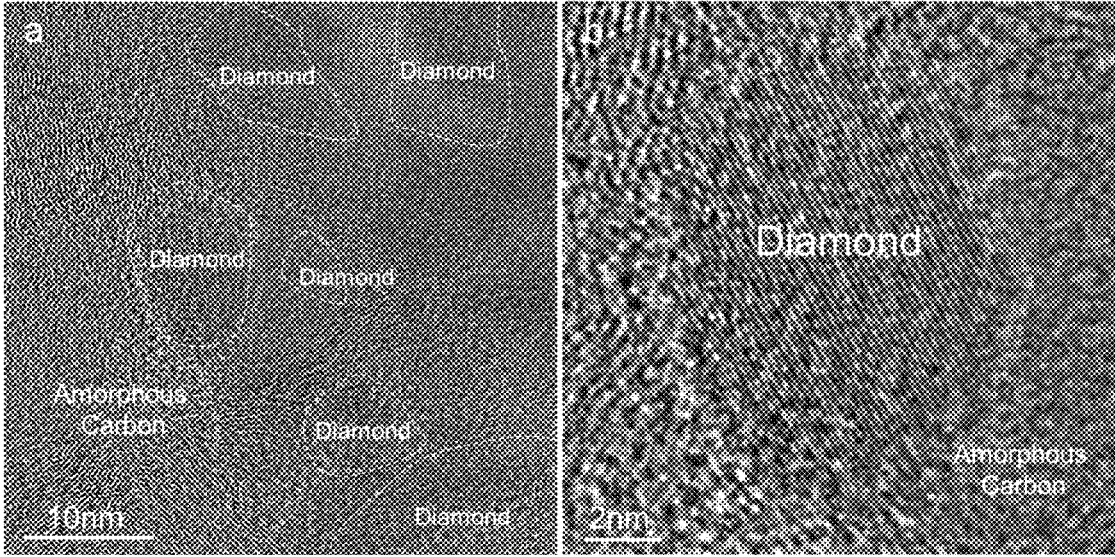
Fig. 2a                                        Fig. 2b

CONDUCTIVE DIAMOND/AMORPHOUS CARBON COMPOSITE MATERIAL HAVING HIGH STRENGTH AND PROCESS FOR PREPARING THE SAME

CROSS-REFERENCE TO RELATED APPLICATION

This application claims priority to Chinese Patent Application No. 202111397981.4 entitled "Conductive Diamond/Amorphous Carbon Composite Material Having High Strength and Process for Preparing the Same" and filed on Nov. 23, 2021, which is incorporated herein by reference in its entirety.

TECHNICAL FIELD

The present application relates to the technical field of inorganic non-metal materials, in particular to a novel carbon material and a process for preparing the same.

BACKGROUND

High-performance structural materials refer to materials that have higher performance than traditional materials in terms of material strength, deformation resistance, light weight, corrosion resistance, material processing efficiency, sustainability, and versatility and thus have broad application prospects in the fields of electronics, machinery, chemical industry, and electronic communication.

Among them, conductive ceramics are a class of materials that have attracted a lot of interests from researchers because they exhibit better functionality than traditional non-conductive ceramic materials and are easier to process while maintaining mechanical properties. Due to the above advantages, they play an important role in the development of society and technology. Traditional ceramics refer to materials such as $Al_2O_3$, $ZrO_2$, $B_4C$, $Si_3N_4$, and the like, the chemical bonds of which are mainly covalent bonds and ionic bonds, and thus they exhibit high strength and insulating performances at room temperature. Nevertheless, this also brings great challenges to processing of traditional ceramics (non-conductive ceramics). By traditional ceramic machining techniques, such as milling, drilling, and turning, ceramics will experience high cutting forces and extensive tool wear, and thus their performances are easy to deteriorate. In contrast, more economical and less destructive removal techniques can be used for conductive ceramics, such as Electrical Discharge Machining (EDM), which techniques can fully exploit the potential of ceramic materials. In addition, such class of conductive materials are also prized for their unique electrical and magnetic properties and play an increasingly important role in many key technologies, including communications, energy conversion and storage, electronics, and automation. Usually, one of the most common ways to obtain conductive ceramics is to add a conductive dielectric to a ceramic matrix, in which carbon nanotubes and graphene are the most commonly used conductive dielectrics for improving ceramics. These flexible carbon materials are dispersed in a ceramic matrix, which helps to reduce the density of ceramics and improve the toughness of ceramics, but weakens the hardness/strength and thermal stability of ceramics due to the weak bonding of the interfaces between the carbon materials and ceramics.

At present, a variety of conductive ceramic materials have been synthesized in laboratory. For extrinsic conductive ceramic composites, however, the most importance is the dispersion of fillers in a ceramic matrix and the quality of the filler-matrix interface, otherwise it would inevitably lead to some degradation of inherent mechanical properties of the ceramic matrix. When carbon nanotubes or graphene are used as nanofillers, they are difficult to disperse uniformly due to van der Waals interactions that bind them together in bundles/clusters. In this case, using traditional mechanical mixing, pressing and sintering will lead to undesirable segregation of the conductive fillers in the ceramic matrix, making it difficult to achieve a uniform conductive network structure.

As a result, such traditional composites often exhibit undesirable material properties, such as non-uniformity in electrical conductivity, and thus produce a very adverse influence on the accuracy of workpieces. In addition, reduced mechanical strength of materials, poor reproducibility of fabrication, and unwanted grain growth are also unavoidable. Taking into account the above factors, it is difficult to meet the currently growing demand in actual industrial production only by the current materials.

SUMMARY

In view of the deficiencies of conductive ceramic composite materials in the prior art, it is very desirable to develop new high-performance structural materials, especially conductive ceramic composite materials.

An object of the present application is to obtain a conductive ceramic material with high strength, excellent electrical conductivity, good machinability and suitability to practical industrial application.

Therefore, in a first aspect of the present application, it provides a carbon composite material, composed of an amorphous carbon continuous phase and multiple separate diamond phases embedded in the amorphous carbon continuous phase, wherein the diamond phases exhibit an ordered sp3 hybrid state, and the amorphous carbon continuous phase exhibits a disordered sp2 hybrid state.

In a second aspect of the present application, it provides a process for preparing the carbon composite material according to the first aspect of the present application, comprising the steps of:

(1) providing one or more type(s) of pure sp3 hybrid carbon powder;

(2) pre-pressing the sp3 hybrid carbon powder into a preform in a mold;

(3) loading the preform into a sintering mold and sintering it; and (4) after the sintering is completed, subjecting the sintered body to rapid cooling so as to cool the sintered body and cavity of sintering equipment quickly to room temperature, and taking out the sintered body for optional processing and post-processing.

In a third aspect of the present application, it provides another process for preparing the carbon composite material according to the first aspect of the present application, comprising the steps of:

(1) providing a block preform of glassy carbon;

(2) loading the block preform of glassy carbon into a sintering mold, and then carrying out a first high temperature and high pressure sintering treatment;

(3) after the first high temperature and high pressure sintering, cooling cavity of sintering equipment slowly to room temperature, releasing pressure, taking out the sintered body, and then loading it into a sintering mold for a second high temperature and high pressure sintering;

(4) after the second high temperature and high pressure sintering, subjecting the sintered body to rapid cooling so as to cool the sintered body and cavity of sintering equipment quickly to room temperature, releasing pressure and taking out the sintered body for optional processing and post-processing.

By adopting the above-mentioned technical solution, the beneficial effects of the embodiments of the present application are as follows: the carbon composite material synthesized according to the present application is a high-strength ceramic material, exhibits good electrical conductivity and good electrical discharge machining capability, and has good chemical stability and lighter weight. In addition, the material has high compactness, good formability, no size limitation, and no phenomena of dissociation and cracking. By changing the synthesis parameters such as the type and grain size of the raw material, as well as the experimental pressure, it is possible to control the microstructure of the material, thereby regulating its performance, and making it have broad application prospects in the fields of aerospace, automobile industry, and biomedical equipment.

The carbon composite material and the preparation process thereof according to the embodiments of the present application will be further described in detail below with reference to the accompanying drawings and specific embodiments.

BRIEF DESCRIPTION OF THE DRAWINGS

FIG. 1 shows a schematic diagram of a stepped pressurization process in the course of pre-pressing according to Examples 1 to 4 of the present application.

FIG. 2a shows a high-resolution transmission electron microscope (HRTEM) image of the sample synthesized in Example 1 of the present application; and FIG. 2b is an enlarged view of a local area of FIG. 2a.

DETAILED DESCRIPTION

Figure 3:
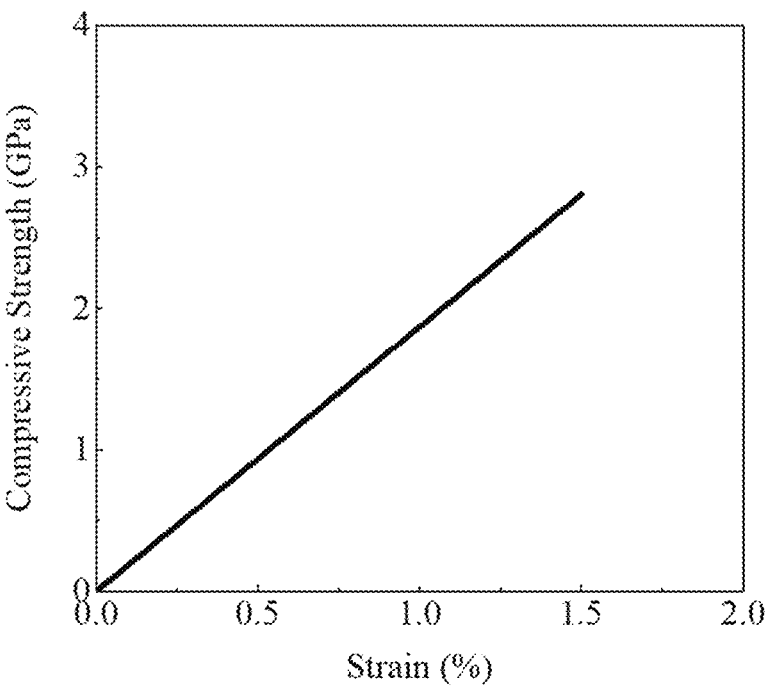
FIG. 3 shows a stress-strain curve obtained by a compressive strength test of the sample synthesized in Example 1 of the present application.

In a first aspect of the present application, a carbon composite material is provided, which is composed of an amorphous carbon continuous phase and multiple separate diamond phases embedded in the amorphous carbon continuous phase, wherein the diamond phases exhibit an ordered sp3 hybrid state, and the amorphous carbon continuous phase exhibits a disordered sp2 hybrid state.

In this application, unless otherwise indicated or defined, all terms should be construed as having the meaning as commonly understood by those skilled in the art. For the sake of clarity, the following terms should be interpreted and understood in accordance with the definitions herein.

In the context of the present application, the term "carbon composite material" refers to a material that is essentially consisted of pure carbon element in terms of its chemical composition, and has two or more distinct phase structure regions inside in terms of its microstructure, for example, viewed by scanning electron microscopy or transmission electron microscopy.

Nevertheless, those skilled in the art could understand that the term "carbon composite material" does not exclude any inevitable small amount of impurity elements that may exist in the raw material itself or are unintentionally introduced during preparation or processing. For the purposes of the present application, the phrase of "essentially consisting of pure carbon element" or "consisting of pure carbon element" means that carbon element is present in a mass of at least 97%, preferably at least 98%, more preferably at least 99%, and the most preferably at least 99.9% or close to 100% of the total mass of the material.

In the present application, the expression "the carbon composite material composed of an amorphous carbon phase and multiple separate diamond phases embedded in an amorphous carbon continuous phase" is related to the microstructure of the material. In particular, the expression "the carbon composite material composed of an amorphous carbon phase and multiple separate diamond phases embedded in an amorphous carbon continuous phase" means that the material is clearly divided into two phases, an amorphous carbons phase and a diamond carbons phase, and the amorphous carbons are interconnected to form a continuous phase in which the diamond nano/micro grains are uniformly or randomly distributed, as observed by high-resolution transmission electron microscopy. In the carbon composite material according to the present application, the amorphous carbons continuous phase provides a conductive pathway, and thus the material exhibits electrical conductivity. In addition, it should be noted that the term "diamond phase" as used herein refers to the sp3 diamond grain phases observed by a high resolution transmission electron microscope. These diamond grain phases form several isolated regions that are dispersed in the amorphous carbon continuous phase.

Those skilled in the art should understand that various technical means may be used to obtain information about microstructure of a material. For example, TEM electron microscopy in SAED (Selected Area Electron Diffraction) and/or HRTEM (High Resolution Transmission Electron Microscopy) mode can often be used to detect the presence of diamond grains and amorphous carbon in a sample of material. For accurate characterization, for TEM detection, it is preferable to analyze an inside area of the material. In addition, in order to avoid interference of a small amount of contaminants that may exist in a sample, multiple (for example, more than 3) sample points can be randomly selected for analysis.

In the carbon composite material according to the present application, the amorphous carbon continuous phase may be present in a volume content of at least 5%, such as at least 10%, 20%, 30%, 40%, 50%, 55%, 60%, 65%, 70%, 75%, 80%, 85%, 90%, 91%, 92%, 93%, 94%, and the like, but generally no more than 95%. The volume content of the amorphous carbon continuous phase can vary widely as desired, so as to allow the skilled artisan to design and prepare carbon composites with various properties. The volume content of the amorphous carbon continuous phase can be determined by those skilled in the art according to conventional techniques. For example, the volume ratio of the two phases can be determined by observing multiple regions of the material with microscopic imaging techniques (such as SEM or TEM), estimating volume ratio of the two phases according to area ratio of the two phases in the microscopic image of the material for each region, and then calculating an average value of the multiple regions, thereby determining the volume ratio of the two phases.

In the carbon composite material according to the present application, the diamond grains generally have a grain size of 5 nm to 50 μm, and the grain size may be greater than 5 nm, greater than 8 nm, greater than 10 nm, greater than 20 nm, greater than 50 nm, greater than 80 nm, greater than 100 nm, greater than 200 nm, greater than 0.5 μm, greater than 1 μm, or greater than 1 μm, and the grain size may be less than 40 μm, less than 30 μm, less than 20 μm, less than 15 μm, less than 10 μm, less than 5 μm, less than 2 μm, less than 1 μm, or less than 0.5 μm. The grain sizes of the diamond phases can be determined by those skilled in the art according to conventional techniques. For example, the grain size may be determined by observing multiple regions of the material with microscopic imaging techniques (such as SEM or TEM), estimating an average size of grains according to the microscopic image of the material for each region, and then calculating an average value of the multiple regions, thereby determining the overall average grain size.

Those skilled in the art could understand that the carbon composite material according to the present application "composed of an amorphous carbon continuous phase and multiple separate diamond phases embedded in the amorphous carbon continuous phase" should be interpreted as covering a situation where, in addition to the amorphous carbon continuous phase and the multiple separate diamond phases, the material may further comprise a small amount of carbon in other phase structures that inevitably form during the manufacturing process. The carbon in other phase structures, if present, is usually present in a volume content of up to 5%, for example, less than 3%, 2%, 1%, 0.5% or 0.3%.

The carbon composite material according to the present application may be in the form of a bulk material (i.e. a block) or may also be pulverized into a granular or powder form, and preferably it is used in the form of a bulk material (or a sintered body). A "bulk" material is understood in the context of this application to mean a stand-alone, single body of material having a volume of at least 1 mm³, for example at least 5 mm³, at least 10 mm³, at least 20 mm³, at least 50 mm³, at least 100 mm³, at least 200 mm³, at least 500 mm³, or at least 1000 mm³. The upper limit of the volume of the bulk material is not particularly limited, and can be selected according to actual needs and capacity of equipment processing, for example, as high as 1000 mm³.

The carbon composite material according to the present application has high strength and high electrical conductivity, and its mechanical properties and electrical properties can be adjusted in a wide range by adjusting the ratio of amorphous phase to diamond phases, the grain size of diamond, the distribution pattern of diamond in the amorphous phase and the like, so as to meet the needs of different applications.

The carbon composite material according to the present application has high strength. Preferably, the carbon composite material has a compressive strength of greater than 1.5 GPa, such as greater than 2.0 GPa, greater than 4.0 GPa, greater than 5.0 GPa, greater than 10.0 GPa, greater than 20.0 GPa, greater than 30.0 GPa, greater than 40.0 GPa, greater than 50.0 GPa, greater than 60.0 GPa, or even greater than 80.0 GPa.

The carbon composite material according to the present application has good electrical conductivity. Preferably, the carbon composite material has an electrical conductivity of greater than 10 S/m, such as greater than 20 S/m, greater than 50 S/m, greater than 80 S/m, greater than 100 S/m, greater than 200 S/m, greater than 400 S/m, greater than 800 S/m, greater than 1000 S/m, greater than 1500 S/m, greater than 2000 S/m, or even greater than 3000 S/m, at room temperature.

The carbon composite material according to the present application can be processed by electrical discharge machining (EDM) equipment, and thus has good machinability.

The carbon composite material according to the present application has good uniformity in structure and property. Preferably, the compressive strength and/or the electrical conductivity is not more than 25%, more preferably not more than 20%, such as not more than 16% or 15%, and the most preferably no more than 12% or 10% deviated from its average value, respectively. The deviation degree can be measured, for example, by randomly selecting 10 regions within the material, measuring compressive strength and/or electrical conductivity for each region, and then calculating the ratio of the standard deviation (STDEV) of the measured values for various regions to the average value using statistical methods.

The carbon composites according to the present application may have a compressive strain of greater than 0.5%, such as greater than 1%, greater than 1.5%, greater than 1.8%, greater than 2.0%, greater than 4.0%, greater than 5.0%, greater than 8.0%, greater than 10.0%, or even greater than 12.0%; and the compressive strain is typically less than 50.0%, such as less than 49.0%, less than 48.0%, less than 47.0%, less than 46.0%, less than 35.0%, less than 20.0%, less than 10.0%, less than 8.0%, less than 6.0%, or even less than 4.0%.

The carbon composites according to the present application may have a Knoop hardness of greater than 10 GPa, such as greater than 20 GPa, greater than 30 GPa, greater than 40 GPa, greater than 50 GPa, greater than 60 GPa, greater than 70 GPa, or even greater than 80 GPa.

In the second aspect of the present application, a process for preparing the carbon composite material according to the first aspect of the present application is provided, the process comprising the steps of:

(1) providing one or more type(s) of pure sp3 hybrid carbon powder;

(2) pre-pressing the sp3 hybrid carbon powder into a preform in a mold;

(3) loading the pre-pressed preform into a sintering mold and sintering it; and (4) after the sintering is completed, subjecting the sintered body to rapid cooling so as to cool the sintered body and cavity of sintering equipment quickly to room temperature, and taking out the sintered body for optional processing and post-processing.

The carbon raw material used in step (1) of the process is sp3 hybrid carbon powder, preferably sp3 hybrid carbon material free of sp2 hybrid carbon component, such as diamond, including cubic diamond and hexagonal diamond. A single type of sp3 carbon powder may be used, or a mixture of multiple sp3 carbon powders may also be used.

The carbon raw material is a powder material, that is, in the form of powder or particles. In order to control the preparation process more precisely, the powder material preferably has a particle size with a narrow distribution. In the application, the term "particle size with a narrow distribution" means that the diamond powder has a relatively concentrated distribution of particle size. That is, the particle size of the diamond powder is relatively uniform. The sp3 hybrid carbon powder as a raw material can be micro-particles or nanoparticles, and its particle size distribution range is generally from 5 nm to 50 μm, preferably from 5 nm to 20 μm, such as about 5 nm, 10 nm, 20 nm, 30 nm, 50 nm, 80 nm, 100 nm, 200 nm, 500 nm, 800 nm, 1 μm, 2 μm, 3 μm, 5 μm, 8 μm, 10 μm, 15 μm, 20 μm, 30 μm, 40 μm, 50 μm, and the like or within a range composed of any two particle size values described above, especially within a range formed by any two adjacent particle size values described above (such as from 30 nm to 50 nm, from 8 μm to 10 μm, and the like).

Alternatively, the term "particle size with a narrow distribution" can also be defined by a particle size distribution index of powder. The particle size distribution index $D_v90/D_v50$ of the sp3 hybrid carbon powder used in step (1) may usually be in the range of 1~10, for example, in the range of 1-5 or 1-3, preferably in the range of 1~2.5, the most preferably, in the range of 1-2. As well known in the art, $D_v50$ represents the particle size at which the cumulative volume distribution of material particles reaches 50%. As well known in the art, $D_v90$ represents the particle size at which the cumulative volume distribution of material particles reaches 90%. The testing methods for $D_v50$ and $D_v90$ are well known in the art. For example, they can be conveniently measured by a laser particle size analyzer (e.g., Malvern Mastersizer 2000).

In the context of the present application, "pure sp3 carbon" is understood to mean that the sp3 carbon has a purity of at least 90%, preferably at least 95%, more preferably at least 97%, most preferably at least 98% or at least 99%. In order to obtain the "pure sp3 carbon", an original crude sp3 carbon material can be purified. The purification treatment can be carried out by for example: treating the carbon raw material with nitric acid, hydrofluoric acid, hydrochloric acid or sulfuric acid, and the like, at a temperature of 20 to 500° C. such as 50° C., 70° C., 90° C., 100° C., 150° C., 200° C., 250° C., 300° C., 350° C., 400° C., 450° C., and the like to dissolve impurities in the carbon raw material. Alternatively, the carbon raw material may be purified with other methods. In some embodiments, a carbon raw material with higher purity may be utilized directly without any purification for removal of impurities. Optionally, the acid-treated sp3 carbon raw material can be washed with deionized water to remove the acid solution, filtered, separated, dried, and the like. Other methods of treating and purifying carbon raw material can also be employed in this application.

In step (2) according to the second aspect of the present application, the carbon powder raw material is pre-pressed into a preform and the preform may have any shape as required, such as a cylinder, a block, a sphere, and the like. The step of pre-pressing into a preform can be carried out with a conventional pressing machine or hydraulic machine, usually at room temperature. If necessary, the step can be carried out in an atmosphere of air or in an inert atmosphere. In step (2) according to the second aspect of the present application, the pre-pressing pressure is not particularly limited, as long as the preform is pressed densely. In order to achieve better effects, however, the pre-pressing pressure should preferably reach more than 5 MPa, such as 8 MPa, 10 MPa, 20 MPa, 30 MPa, 40 MPa, 50 MPa, or the like. The pre-pressing step is preferably carried out for a pre-pressing holding time of 0.5 min or more and 10 min or less, and more preferably from 1 to 2 min. If the pre-pressing holding time is less than 0.5 min, the pre-pressing is insufficient, and it is difficult to achieve the purpose of pre-pressing treatment. If the pre-pressing holding time exceeds 10 min, there is no significant difference in the treatment effect, and the performance of the resulting synthetic carbon material will not be affected. So, a longer pre-pressing holding time is not advantageous from an economic point of view.

In a preferred embodiment of the present application, the pre-pressing step is carried out with a stepwise bidirectional pressure, which can make the powder in the forming mold to be compacted uniformly in both directions, thereby reducing the pressure gradient between the upper and lower sides of the pre-pressed preform, and avoiding large density difference between the upper and lower sides of the pre-pressed preform. As a result, the overall compactness of the sintered block is increased, the compactness of the preform is higher and the performance of the synthesized samples is advantageously improved. Therefore, applying a stepwise bidirectional pressure can make the powder more dense, which is beneficial to the formability and uniformity of the subsequent sintered body.

Step (3) comprises sintering the pre-compacted preform of powder. The sintering method in step (3) is not particularly limited, and can be high temperature and high pressure sintering, spark plasma sintering, hot pressing sintering, microwave sintering and pressureless sintering, as long as a high-strength conductive carbon material with a composite structure of diamond and amorphous carbon can be obtained. Among them, in order to ensure product performance, a preferred sintering method is a high temperature and high pressure method, a spark plasma method or a hot pressing method.

In a preferred embodiment of the present application, a high temperature and high pressure sintering method is adopted, wherein the sintering is carried out at a sintering pressure of not less than 0.5 GPa and not more than 25 GPa and a temperature of not less than 800° C. and not more than 2500° C., so as to obtain a conductive carbon composite material with high strength. The sintering pressure is, for example, 0.5 GPa, 0.8 GPa, 1 GPa, 2 GPa, 5 GPa, 10 GPa, 12 GPa, 15 GPa, 18 GPa, 20 GPa, 25 GPa or the like. The sintering temperature can be, for example, 800° C., 900° C., 1000° C., 1100° C., 1200° C., 1300° C., 1400° C., 1500° C., 1600° C., 1700° C., 1800° C., 1900° C., 2000° C., 2100° C., 2200° C., 2300° C., 2400° C., 2500° C. or other temperatures. In step (3), when using the high temperature and high pressure sintering method, the sintering is preferably carried out for a holding time of 5-60 min. If the holding time is less than 5 min, the sintering is insufficient, and the sintered sample may be not dense. If the holding time is higher than 60 min, there will be no significant difference in the sintering state of the sample because the state of the sample obtained by this method is mainly affected by the sintering pressure and temperature.

In another preferred embodiment of the present application, the sintering is performed by a spark plasma method, the sintering mold is a graphite mold, and the periphery of the graphite mold is wrapped with carbon felt. The sintering step may be performed as follows: evacuating the equipment until the vacuum degree is higher than $1 \times 10^{-1}$ Pa, and then increasing the pressure to the sintering pressure; after the sintering pressure is stabilized, increasing the temperature to the sintering temperature; and after the high-temperature sintering, stopping the heating program and releasing the pressure. The sintering pressure applied by the spark plasma method is from 20 MPa to 50 MPa such as 20 MPa, 25 MPa, 30 MPa, 35 MPa, 40 MPa, 45 MPa, 50 MPa, or the like, and the sintering temperature is from 800° C. to 2200° C. such as 800° C., 900° C., 1000° C., 1100° C., 1200° C., 1300° C., 1400° C., 1500° C., 1600° C., 1700° C., 1800° C., 1900° C., 2000° C., 2100° C., 2200° C. or the like. In step (3), when a spark plasma method is used for sintering, the heating rate is preferably from 50° C./min to 200° C./min, and the holding time is preferably from 1 min to 30 min.

Depending on the selected sintering method, the sintering treatment can be carried out by sintering equipment well known to those skilled in the art, such as muffle furnace, tube furnace, hot pressing furnace, pulse spark plasma sintering furnace, high temperature and high pressure sintering equipment without or with pressure. The sintering process can be carried out in an inert atmosphere, or in the atmosphere of air, if desired.

In addition, in the sintering process, it is preferable to adopt a stepwise heating to avoid adverse effects caused by excessive volume shrinkage of the preform during the sintering process, so that the internal stress can be eliminated as much as possible, and the generation of micro-cracks can be avoided so as not to adversely affect the performance of the sintered sample.

In addition, it is preferable to dry the pre-pressed preform or assembly of the pre-pressed preform and the sintering mold in step (2) and/or step (3) prior to sintering, for example after pre-pressing the carbon powder into a preform, and/or after loading the pre-pressed perform into a sintering mold.

After the sintering is completed, the sintered body is subjected to rapid cooling in step (4) so as to cool the sintered body and cavity of an apparatus for sintering quickly to room temperature, and if the sintering is performed under high pressure, the internal pressure of the apparatus is adjusted to ambient pressure (i.e. performing pressure relief), and then the sintered body is taken out for optional processing and post-treatment such as electrical discharge machining, grinding and polishing, and the like, thereby obtaining the carbon composite material according to the present application. The rapid cooling in step (4) generally means that after the sintering is completed, the heating is stopped immediately, so that the cavity of apparatus is cooled quickly to room temperature. After the sintering is completed, the sintered body and the cavity of the sintering apparatus are cooled rapidly to room temperature by means of quenching such as power-off quenching, which is conducive to keeping the amorphous carbon structure and avoiding the crystallization of sp2 hybrid carbon.

In addition to sp3 hybrid carbon powder as a raw material, the inventors have found that glassy carbon can also be used as a raw material to prepare the carbon composite material described in the first aspect of the present application. Therefore, in the third aspect of the present application, a process for preparing the carbon composite material according to the first aspect of the present application is provided, the process comprising the steps of:

(1) providing a block perform of glassy carbon;

(2) loading the block perform of glassy carbon into a sintering mold, and then carrying out a first high temperature and high pressure sintering treatment;

(3) after the first high temperature and high pressure sintering, cooling cavity of sintering equipment slowly to room temperature, releasing pressure, taking out the sintered body, and then loading it into a sintering mold for a second high temperature and high pressure sintering;

(4) after the second high temperature and high pressure sintering, subjecting the sintered body to rapid cooling so as to cool the sintered body and cavity of sintering equipment quickly to room temperature, releasing pressure, and taking out the sintered body for optional processing and post-processing.

The glassy carbon raw materials used in step (1) of the process can be various glassy carbons known in the art or commercially available glassy carbon that may be used directly. For example, they may be directly commercially available block glassy carbons, or may be a block perform formed from glassy carbon powder or granules by compression. The block perform can be of any shape as required, such as a cylinder, a block, a sphere, and the like.

In the first high temperature and high pressure sintering of step (2), it is preferable to use a sintering pressure of 0.5 GPa or higher and 15 GPa or lower and a sintering temperature of 500° C. or higher and 1500° C. or lower. The sintering pressure is, for example, 0.5 GPa, 0.8 GPa, 1 GPa, 2 GPa, 5 GPa, 10 GPa, 12 GPa, 15 GPa, or the like. The sintering temperature can be, for example, 500° C., 600° C., 700° C., 800° C., 900° C., 1000° C., 1100° C., 1200° C., 1300° C., 1400° C., 1500° C. or the like. In the first high temperature and high pressure sintering of step (2), the preferred holding time is from 5 to 60 min. The high temperature and high pressure sintering of step (2) can be performed in various known high temperature and high pressure sintering equipment in the art.

Prior to the first high temperature and high pressure sintering, it is preferable to dry the block preform or the assembly of the block preform and the sintering mold.

After the first high temperature and high pressure sintering of step (2), the temperature is slowly lowered to obtain amorphous compressed glassy carbon including amorphous sp2 hybrid carbon and amorphous sp3 hybrid carbon. Here, "slow cooling" means controlled stepwise cooling. That is, the heating temperature is gradually reduced after sintering. For example, a typical slow cooling procedure is to first hold the temperature at 1500° C. for 10 minutes, lower it at a rate of 50° C./min to 1000° C., then hold the temperature of 1000° C. for 5 minutes, then lower it to 500° C. at a rate of 50° C./min, and hold it for 2 minutes, and finally, lower the temperature to room temperature at a rate of 50° C./min.

In the second high temperature and high pressure sintering of step (3), it is preferable to use a sintering pressure of 0.5 GPa or higher and 25 GPa or lower and a sintering temperature of 800° C. or higher and 2500° C. or lower to obtain a conductive carbon composite material with high strength. The sintering pressure is, for example, 0.5 GPa, 0.8 GPa, 1 GPa, 2 GPa, 5 GPa, 10 GPa, 12 GPa, 15 GPa, 18 GPa, 20 GPa, 25 GPa or the like. The sintering temperature can be, for example, 800° C., 900° C., 1000° C., 1100° C., 1200° C., 1300° C., 1400° C., 1500° C., 1600° C., 1700° C., 1800° C., 1900° C., 2000° C., 2100° C., 2200° C., 2300° C., 2400° C., 2500° C. or other temperatures. In the second high temperature and high pressure sintering of step (3), the preferred holding time is from 5 to 60 min. If the holding time is less than 5 min, the sintering is insufficient and the sintered sample may be not dense. If the holding time is higher than 60 min, there will be no significant difference in the sintering state of the sample since the state of the samples obtained by this method is mainly affected by the sintering pressure and temperature. The high temperature and high pressure sintering of step (3) can be performed in various known high temperature and high pressure sintering apparatuses in the art.

In addition, in the second high temperature and high pressure sintering process, it is preferable to use a stepwise heating to avoid adverse effects caused by the excessive shrinkage of the perform during the sintering process, so that the internal stress can be eliminated as much as possible and the generation of micro cracks may be avoided so as not to adversely affect the performance of the sintered sample.

After the second high temperature and high pressure sintering process is completed, the sintered body is subjected to rapid cooling in step (4) so as to cool the sintered body and cavity of sintering equipment quickly to room temperature, pressure is released, and then the sintered body is taken out for optional processing and post-treatment such as electrical spark machining, grinding and polishing, and the like, thereby obtaining the carbon composite material according to the present application. The rapid cooling generally means that after the sintering is completed, the heating is stopped immediately, so that cavity of sintering equipment is rapidly cooled to room temperature. After the sintering is completed, the sintered body and cavity of sintering equipment are rapidly cooled to room temperature by means of quenching such as power-off quenching, which is conducive to keeping the amorphous carbon structure and avoiding the crystallization of sp2 hybrid carbon.

In the embodiments of the present application, a class of high-strength conductive carbon-based composite materials is obtained by sintering diamond powder or compressed glassy carbon and other sp3 carbon materials. With the use of sp3 carbon powder, the sp3 carbon powder undergoes a phase change during the sintering process. In the early stage of sintering, the diamond is partially graphitized to form disordered sp2 carbon, that is, the ordered sp3 hybrid carbon (diamond) is partially transformed into disordered sp2 hybrid carbon (amorphous carbon), and the diamond grains are dispersed in the continuous phase of amorphous carbon. With the use of sp3 carbon powder (or compressed glassy carbon) as raw material, the high-strength conductive carbon-based material as prepared is an in-situ composite material, and its microstructure distribution is more uniform, and its compactness and strength are relatively high. In addition, since the conductive carbon-based in-situ composite is basically composed of pure carbon element, the problem of uneven performance caused by adding other elements or other external phases is avoided.

The carbon composite material and preparation process according to the present application will be further described below with reference to the examples.

EXAMPLES

The examples described below are some, but not all, embodiments of the present application. Detailed descriptions of examples of the invention are not intended to limit the scope of the invention as claimed, but are merely representative of specific examples of the invention. Based on the examples of the present application, all other examples obtained by those of ordinary skill in the art without departing from the principles of disclosed herein and without making creative efforts shall fall within the protection scope of the appended claims.

For the sake of brevity, some materials, equipment and method steps conventionally used in the art are not specified in the examples. All the technical methods and analysis and testing procedures (and related parameters) not specifically indicated in the examples should be carried out according to the conventional practice known by those skilled in the art and all materials and equipment without specific sources are routine materials and equipment commonly used in laboratory.

Equipment and Analysis and Testing Methods

The high temperature and high pressure sintering equipment used in various examples was a six-sided top hydraulic press CS-1B produced by state-owned Guilin Metallurgical Machinery General Plant (China) or a T25 press produced by Rockland Research Company of the United States.

The spark plasma sintering equipment used in various examples was SPS-3.20MK-IV of Sumitomo Coal Mining Co., Ltd. (Japan).

The electrical discharge machining (EDM) equipment used in various examples was provided by Jiangzhou CNC Machine Tool Manufacturing Co., Ltd, Taizhou city (China).

The main analysis and testing methods used in various examples and the used instruments were as follows:

Particle size of raw material powders: determined by Malvern Mastersizer 2000 according to the method recommended in the instrument manual.

HRTEM: TEM samples (4 μm×8 μm×0.1 μm) were prepared by focused ion beam (FIB) and tested by Thermo Fisher Talos F200X scanning transmission electron microscope (Thermo Fisher Scientific, USA) with an accelerating voltage of 300 kV.

Knoop hardness: The hardness of a tested sample was measured by KB-5-BVZ hardness tester, Germany. The loading time was 30 s and the pressure holding time was 30 s. By applying a certain load, the indenter was pressed into the tested sample and traces of plastic deformation were left on the surface of the sample after removal of load.

Compressive strength and compressive strain:

(1) Macroscopic compressive strength test: EDM equipment was used to process a tested sample into a cylinder with a diameter of about 2~5 mm and a diameter-to-height ratio (aspect ratio) of about 1:2. A material mechanical property testing machine from Jinyinfeng Instrument Co., Ltd., Jinan City (China), was used to test the compressive properties, and the loading rate was adjusted as needed within the range of $5 \times 10^{-5} \sim 1 \times 10^{-3}$ s$^{-1}$.

(2) Microscopic compressive strength test: On an PEI-Helios Focused Ion Beam (FIB) device, a Ga ion beam with an accelerating voltage of 30 kV was used to prepare micropillars with a diameter of about 1 μm and an aspect ratio of about 1:2 for compressive strength testing. The in-situ compression tests were carried out on an in-situ SEM instrument (PI-88, Hysitron) equipped with a high-load sensor to obtain real-time deformation details and processes in the field, and the experiments were carried out at a constant strain rate of 10%.

Room Temperature Electrical conductivity: The resistivity of a tested sample was measured by a four-wire method in a comprehensive physical property measurement system (PPMS), Quantum Design, USA.

Example 1

The preparation method included the following steps:

(I) Pre-pressing of materials: 1 g of diamond nanopowder commercially available from Shanghai Aladdin Biochemical Technology Co., Ltd. (China), with a particle size of 30-50 nm was weighted, and the powder was placed in a hard alloy mold with an inner diameter of 6 mm and pre-pressed with a pressure of 20 MPa. The pressure was applied by applying stepwise bidirectional pressures simultaneously; and the pressure holding time was 1 min, thereby obtaining a cylindrical preform with good formability.

(II) Assembling: The preform in step (I) was loaded into a high-pressure assembly, and was dried in a drying oven at 180° C. for 1 h to fully remove moisture so as to avoid adverse effects of water vapor on the performance of the sample.

(III) High-pressure sintering: The dried assembly block was taken out and lowered to room temperature, and then it was put into a cavity of a six-sided top press for high-pressure experiments. The pressure was increased to a pressure of 3 GPa at a pressure increase rate of 3 GPa/min After the pressure was stabilized, the temperature was increased to 1200° C. at a heating rate of 80° C./min, and the temperature was kept for 5 min After the press was stabilized, the experimental pressure was raised to 5.5 GPa at the above same pressure increase rate, and the sintering temperature was increased to 1400° C. and was kept for 15 min. After that, the heating was stopped, so that the temperature quickly dropped to room temperature. After the temperature dropped to room temperature, the pressure was released at a rate of 0.5 GPa/min so that the pressure was reduced to ambient pressure within 10 minutes, and then the sample was taken out.

The performance testing process was as follows: the obtained carbon samples were processed into strips and cylinders using wire EDM, and ground and polished to a standard size using diamond abrasive powder, and then the samples were subjected to compressive strength and bending strength test at room temperature using a material mechanical property testing machine. The sample used for the compressive strength test was a cylinder with a diameter of 2.5 mm and a height of 4 mm, and the strain rate loaded by the material mechanical property testing machine was $1 \times 10^-$3/s. The electrical conductivity of the sample was tested by a comprehensive physical property measurement system (PPMS).

The high-strength, conductive diamond/amorphous carbon composite material of the example was an opaque dense block. FIGS. 2a and 2b showed high-resolution TEM images of this sample in which the dotted part was the ordered sp3 hybrid carbon (i.e., diamond), surrounded by disordered sp2 hybrid carbon (amorphous carbon). This sample was measured to have a compressive strength of 2.8 GPa and a compressive strain of 1.5% (FIG. 3). The room temperature electrical conductivity of the sample prepared under this condition was 2000 S/m.

Example 2

The carbon composite material was prepared by methods and steps similar to those in Example 1, and the same test process was carried out. The specific process parameters different from those in Example 1 are shown in Table 1.

The high-strength, conductive diamond/amorphous carbon composite material of the example was an opaque dense block. This sample was measured to have a compressive strength of 4.2 GPa, a compressive strain of 1.3% and a room temperature electrical conductivity of 1450 S/m.

Example 3

The carbon composite material was prepared by methods and steps similar to those in Example 1, and the same test process was carried out. The specific process parameters different from those in Example 1 are shown in Table 1.

The high-strength, conductive diamond/amorphous carbon composite material of the example was an opaque dense block. This sample was measured to have a compressive strength of 6.2 GPa, a compressive strain of 1.8% and a room temperature electrical conductivity of 540 S/m.

Example 4

The preparation method included the following steps:

(I) Pre-pressing of materials: 1 g of diamond nanopowder commercially available from Shanghai Aladdin Biochemical Technology Co., Ltd. (China), with a particle size of 15-20 μm was weighted, and the powder was placed in a hard alloy mold with an inner diameter of 20 mm and pre-pressed with a pressure of 30 MPa. The pressure was applied by applying stepwise bidirectional pressures simultaneously; and the pressure holding time was 1 min, thereby obtaining a cylindrical preform with good formability. The pre-pressed preform was placed into a sintering mold, the sintering mold was a graphite mold, and the periphery of the graphite mold was wrapped with carbon felt.

(II) Sintering: The preform in step (I) together with the sintering mold was put into spark plasma sintering equipment for sintering, and the sintering was carried out by a spark plasma sintering method. First, the sintering equipment was evacuated to a vacuum of $1 \times 10^{-1}$ Pa, and then pressurized to a sintering pressure of 50 MPa. After the sintering pressure was stabilized, the temperature was raised to the sintering temperature of 1800° C. at a heating rate of 150° C./min, and was held for 10 min. After the high temperature sintering, the heating program was turned off, so that the temperature dropped to room temperature rapidly. After the temperature dropped to room temperature, the pressure was released and then the mold was taken out and the sintered body was released from the mold to obtain a high-strength conductive diamond/amorphous carbon composite block. Vacuuming is conducive to the escape of gas from the closed pores in the preform, and can improve the compactness of the final prepared product.

The performance testing process was as follows: the obtained carbon samples were processed into strips and cylinders using wire EDM, and ground and polished to a standard size using diamond abrasive powder, and the samples were subjected to compressive strength and bending strength test at room temperature using a material mechanical property testing machine. The sample used for the compressive strength test was a cylinder with a diameter of 3 mm and a height of 5.5 mm, and the strain rate loaded by the material mechanical property testing machine was $1 \times 10^-$3/s. The electrical conductivity of the sample was tested by a comprehensive physical property measurement system (PPMS).

The high-strength, conductive diamond/amorphous carbon composite material of the example was an opaque dense block. This sample was measured to have a compressive strength of 2.6 GPa (FIG. 3), a compressive strain of 1.4% and a room temperature electrical conductivity of 220 S/m.

Example 5

The preparation method includes the following steps:

(I) Prefabrication of Precursor: Glassy carbon commercially available from Alfa Aesar Chemical Co., Ltd. was processed into a cylinder with a diameter of 1.5 mm and a height of 2.3 mm, and was put into a hexagonal boron nitride (hBN) crucible, which was loaded into a standard high-voltage assembly. The assembly was dried at 180° C. for 1 hour, and then was placed in a T25 press, in which the pressure was 15 set to GPa, the temperature was set to 900° C., and the pressure and temperature were maintained for 60 minutes. The heating was stopped by power off so that the internal temperature of the cavity was lowered to room temperature, and then the pressure was slowly released to obtain an amorphous compressed glassy carbon including amorphous sp2 hybrid carbon and amorphous sp3 hybrid carbon.

(II) High Pressure Sintering: The compressed glassy carbon obtained in step (II) was prefabricated into a cylindrical preform with a diameter of 1.2 mm and a height of 2.0 mm. The preform was put into a hexagonal boron nitride crucible, which was loaded into a standard high temperature and high pressure assembly. The assembly was placed in a T25 ultra-high pressure temperature synthesis device and heated for 60 min under a pressure of 25 GPa and a temperature of 1000° C., in which the pressure increase rate was 1.5 GPa/h, and the heating rate was 50° C./min.

The performance testing process was as follows: the high-pressure synthetic sample was polished with a multi-segment diamond abrasive paste, and the Knoop hardness of the sample was measured using a KB-5 BVZ microhardness tester. On an FEI-Helios focused ion beam (FIB) device, a Ga ion beam with an accelerating voltage of 30 kV was used to prepare micropillars with a diameter of about 1 μm and an aspect ratio of about 1:2 for in-situ compressive strength (FIG. 4), the compressive strain was 9.4% (FIG. 5), and the electrical conductivity of the material at room temperature was 660 S/m.

Example 6

The carbon composite material was prepared by methods and steps similar to those in Example 5, and the same test process was carried out. The specific process parameters different from those in Example 5 are shown in Table 1.

Figure 4:
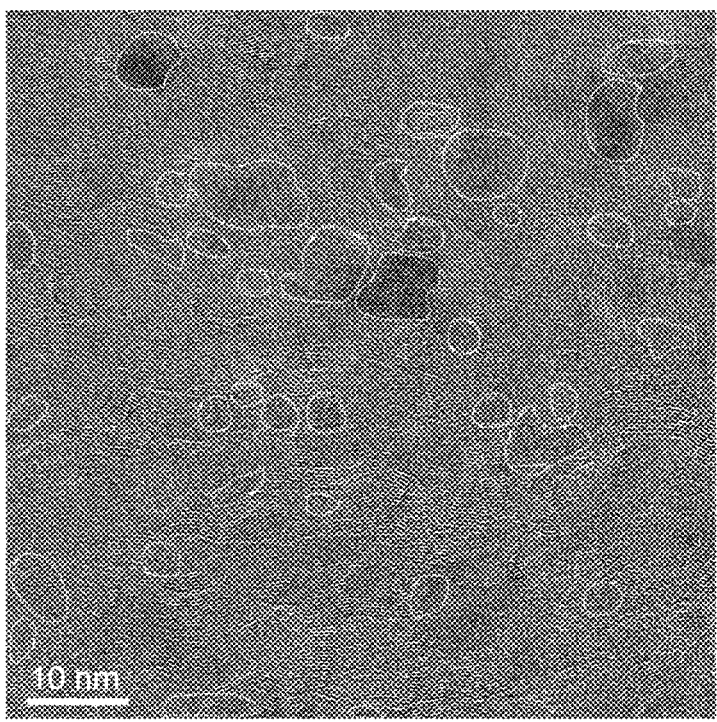
FIG. 4 shows a high-resolution transmission electron microscope (HRTEM) image of the sample synthetized in Example 5 of the present application.
Figure 5:
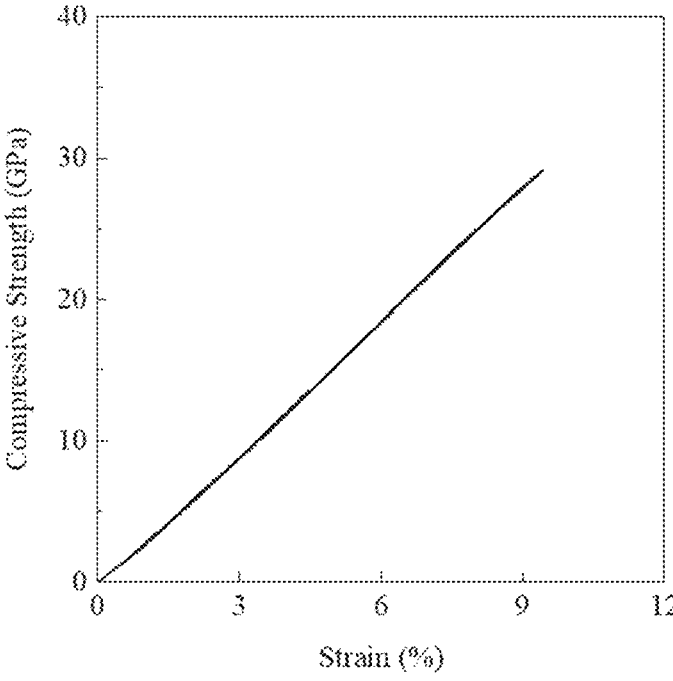
FIG. 5 shows a stress-strain curve obtained by a compressive strength test of the sample synthesized in Example 5 of the present application.
Figure 6:
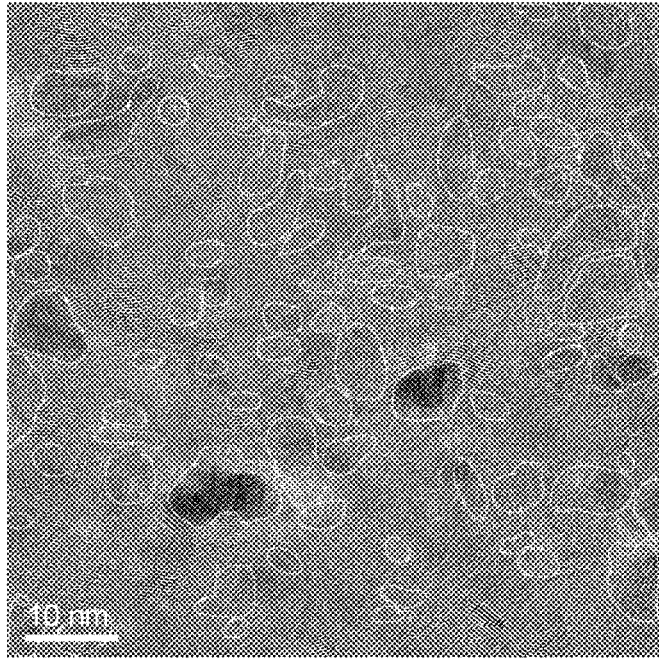
FIG. 6 shows a high-resolution transmission electron microscope (HRTEM) image of the sample synthetized in Example 6 of the present application.
Figure 7:
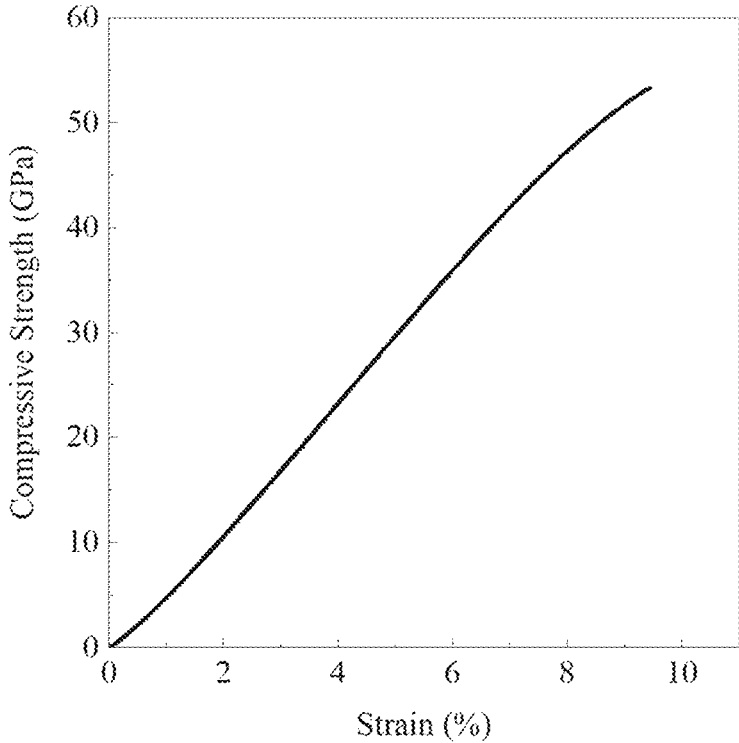
FIG. 7 shows a stress-strain curve obtained by a compressive strength test of the sample synthesized in Example 6 of the present application.

The high-strength, conductive diamond/amorphous carbon composite material of the example was an opaque dense block. FIG. 6 shows a HRTEM photograph of the sample in which its diamond content was significantly increased relative to Example 5 (FIG. 4). The Knoop hardness of the sample prepared under this condition was measured to be 55 GPa, the compressive strength of the sample was 51 GPa, the compressive strain was 10% (FIG. 7), and the electrical conductivity of the material at room temperature was 130 S/m.

The preparation process parameters and the test results of the materials as prepared in the above-mentioned examples are shown in Table 1 and Table 2 below.

TABLE 1

Preparation process parameters of diamond/amorphous carbon composite materials of examples 1-6

| Process parameters | | Examples | | | | | |
|---|---|---|---|---|---|---|---|
| | | 1 | 2 | 3 | 4 | 5 | 6 |
| Raw materials | Type | Diamond | Diamond | Diamond | Diamond | Compressed glassy carbon | Compressed glassy carbon |
| | Hybrid type | Ordered sp$^3$ | Ordered sp$^3$ | Ordered sp$^3$ | Ordered sp$^3$ | Disordered sp$^2$ + Disordered sp$^3$ | Disordered sp$^2$ + Disordered sp$^3$ |
| | Grain size | 30-50 nm | 1-2 μm | 100-200 nm | 15-20 μm | | |
| Step (I) | Pre-pressing pressure (MPa) | 20 | 20 | 20 | 30 | | |
| | Holding time (min) | 1 | 1 | 1 | 2 | | |
| Step (II) | Sintering ways | High temperature high pressure | High temperature high pressure | High temperature high pressure | Spark plasma | High temperature high pressure | High temperature high pressure |
| | Sintering pressure | 5.5 GPa | 6.5 GPa | 12 GPa | 50 MPa | 25 GPa | 25 GPa |
| | Sintering temperature (° C.) | 1400 | 1600 | 1700 | 1800 | 1000 | 1100 |
| | Holding time (min) | 15 | 15 | 15 | 10 | 15 | 15 |
| | Cooling ways | Rapid cooling | Rapid cooling | Rapid cooling | Rapid cooling | Rapid cooling | Rapid cooling | testing. The in-situ compression tests were carried out on a SEM instrument (PI-88, Hysitron) equipped with a high-load sensor to obtain real-time deformation details and processes in the field, and the experiments were carried out at a constant strain rate of $1\times10^{-3}$/s. The electrical conductivity of a tested sample was measured by a comprehensive physical property measurement system (PPMS).

The high-strength, conductive diamond/amorphous carbon composite material of the example was an opaque dense block. FIG. 4 shows a HRTEM photograph of the sample in which the part outlined by the dotted line was diamond, and the rest was amorphous carbon. The Knoop hardness of the sample prepared under this condition was measured to be 35 GPa, the compressive strength of the sample was 29 GPa

TABLE 2

Performance parameters of diamond/amorphous carbon composite materials of examples 1-6

| Performance results | Examples | | | | | |
|---|---|---|---|---|---|---|
| | 1 | 2 | 3 | 4 | 5 | 6 |
| Compressed sample size (μm) | 2500 | 3000 | 3000 | 3000 | 1 | 1 |
| Compressive Strength (GPa) | 2.8 | 4.5 | 6.2 | 2.6 | 29 | 51 |
| Compressive strain (%) | 1.5 | 1.3 | 1.8 | 2.1 | 9.4 | 10 |
| Compressive strength deviation degree (%) | 12 | 15 | 14 | 10 | 12 | 16 |

TABLE 2-continued

| Performance results | Performance parameters of diamond/amorphous carbon composite materials of examples 1-6 | | | | | |
| --- | --- | --- | --- | --- | --- | --- |
| | Examples | | | | | |
| | 1 | 2 | 3 | 4 | 5 | 6 |
| Room temperature electrical conductivity (S/m) | 2000 | 1450 | 540 | 220 | 660 | 130 |
| Compatible with EDM? | YES | YES | YES | YES | YES | YES |

The above embodiments are only preferably specific embodiments of the present application, the intended protection scope, however, is not limited thereto. Any changes or alternatives that could be readily envisaged by a person skilled in the art within the technical scope disclosed in the present application shall fall within the intended protection scope. Therefore, the intended protection scope should be determined by the scope as claimed in the claims.

The specification of the present application lists some optional materials for various components, but those skilled in the art should understand that the above listings of components or materials are neither restrictive nor exhaustive. All the components can be equally replaced with other equivalent materials not mentioned in the specification of the application to achieve the purpose of the application. The specific examples mentioned in the specification are only for the purpose of explanation and not for limiting the intended protection scope.

In addition, the amount ranges of each component described in the present application include any combination of any lower with any upper limit mentioned in the specification and include any range obtained by using any specific amount of the component disclosed in each specific embodiment as the upper or lower limit. All these ranges are included in the intended protection scope. These combined ranges are not exhaustively listed in the description only for the purpose of simplicity. Moreover, each feature of the present application listed in the specification can be combined with any other feature of the present application, and any such combinations also fall within the intended protection scope. These combined ranges are not exhaustively listed in the description only for the purpose of simplicity.

What is claimed is:

1. A process for preparing the carbon composite material, comprising the steps of:
   (1) providing a block preform of glassy carbon;
   (2) loading the block preform of glassy carbon into a sintering mold, and then carrying out a first high temperature and high pressure sintering treatment;
   (3) after the first high temperature and high pressure sintering, cooling cavity of sintering equipment slowly to room temperature following by pressure relieve, taking out the sintered body, and then loading it into a sintering mold for a second high temperature and high pressure sintering, wherein cooling cavity of sintering equipment slowly to room temperature is a controlled stepwise cooling;
   (4) after the second high temperature and high pressure sintering, subjecting the sintered body to rapid cooling so as to cool the sintered body and cavity of sintering equipment quickly to room temperature, releasing pressure and taking out the sintered body for optional processing and post-processing,
   wherein the carbon composite material is composed of an amorphous carbon continuous phase and multiple separate diamond phases embedded in the amorphous carbon continuous phase, and wherein the diamond phases exhibit an ordered sp3 hybrid state, and the amorphous carbon continuous phase exhibits a disordered sp2 hybrid state.

2. The process for preparing the carbon composite material as claimed in claim 1, wherein:
   the first high temperature and high pressure sintering in step (2) is carried out at a sintering pressure of 0.5 GPa to 15 GPa and a sintering temperature of 800° C. to 1500° C.; and/or
   the second high temperature and high pressure sintering in step (4) is carried out at a sintering pressure of 0.5 GPa to 25 GPa and a sintering temperature of 800° C. to 2500° C.

3. The process for preparing the carbon composite material as claimed in claim 1, wherein the controlled stepwise cooling is to first hold the temperature at 1500° C. for 10 minutes, lower it at a rate of 50° C./min to 1000° C., then hold the temperature of 1000° C. for 5 minutes, then lower it to 500° C. at a rate of 50° C./min, and hold it for 2 minutes, and finally, lower the temperature to room temperature at a rate of 50° C./min.

4. The process for preparing the carbon composite material as claimed in claim 1, wherein the amorphous carbon continuous phase is present in a volume content of at least 5%, or at least 10%, or at least 20%.

5. The process for preparing the carbon composite material as claimed in claim 1, wherein the carbon composite material has a compressive strength of greater than 1.5 GPa, and a room temperature electrical conductivity of greater than 10 S/m.

6. The process for preparing the carbon composite material as claimed in claim 5, wherein the compressive strength and/or the electrical conductivity is not more than 25% deviated from its average value, respectively.

7. The process for preparing the carbon composite material as claimed in claim 1, wherein the carbon composite material is in the form of a bulk material.

8. The process for preparing the carbon composite material as claimed in claim 4, wherein the carbon composite material is in the form of a bulk material.

* * * * *